United States Patent
Gulick (10) Patent No.: US 6,952,751 B1
(45) Date of Patent: Oct. 4, 2005

(54) METHOD AND APPARATUS FOR EXTENDING LEGACY COMPUTER SYSTEMS

(75) Inventor: Dale E. Gulick, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 433 days.

(21) Appl. No.: 09/544,858

(22) Filed: Apr. 7, 2000

(51) Int. Cl.[7] .................. G06F 13/36; G06F 13/42; H04Q 1/30
(52) U.S. Cl. .................. 710/315; 710/106; 340/74.3
(58) Field of Search .................. 710/315, 105, 710/10; 709/235; 340/74.3; 370/405; 379/284; 235/492

(56) References Cited

U.S. PATENT DOCUMENTS

| | | | | |
|---|---|---|---|---|
| 4,807,282 A | * | 2/1989 | Kazan et al. | 379/284 |
| 5,086,426 A | * | 2/1992 | Tsukakoshi et al. | 370/405 |
| 5,420,412 A | * | 5/1995 | Kowalski | 235/492 |
| 5,898,886 A | * | 4/1999 | Hewitt | 710/105 |
| 5,905,448 A | * | 5/1999 | Briancon et al. | 340/7.43 |
| 6,170,027 B1 | * | 1/2001 | Lu et al. | 710/315 |
| 6,185,629 B1 | * | 2/2001 | Simpson et al. | 710/10 |
| 6,434,654 B1 | * | 8/2002 | Story et al. | 709/235 |

OTHER PUBLICATIONS

Intel, "Low Pin Count (LPC) Interface Specification Revision 1.0," pp. 1–31 (Sep. 29, 1997).
Standard Microsystem Corporation, "100 Pin Enhanced Super I/O for LPC Bus with SMBus Controller for Commercial Application," Part No. LPC47B37x, pp. 1–254 (Jun. 17, 1999).

* cited by examiner

*Primary Examiner*—Glenn A. Auve
*Assistant Examiner*—Christopher E. Lee
(74) *Attorney, Agent, or Firm*—Williams, Morgan & Amerson (57) ABSTRACT

A method and system for operating a bus according to a plurality of bus protocols, including a legacy bus protocol. A first signal is transmitted indicating a transaction request of a first kind. A second signal is transmitted indicating a transaction request of a second kind. The second signal may be decoded according to a plurality of protocols. The first signal is decoded prior to decoding the second signal. The decode of the first signal indicates which of the plurality of protocols should be used to decode the second signal. A computer system includes a bus, preferably an LPC bus, coupling two or more devices.

38 Claims, 8 Drawing Sheets

METHOD AND APPARATUS FOR EXTENDING LEGACY COMPUTER SYSTEMS

BACKGROUND OF THE INVENTION

1. Field of the Invention

This invention relates generally to computing systems, and, more particularly, to a method and apparatus for extending legacy systems to allow additional transactions over a computer bus.

2. Description of the Related Art

In computer systems, particularly personal computers, it is common practice to have generally standardized devices, subsystems, buses, and/or bridges to exchange signals between computer subsystems. A computer system may include a plurality of such standardized devices, subsystems buses and/or bridges.

Figure 1:
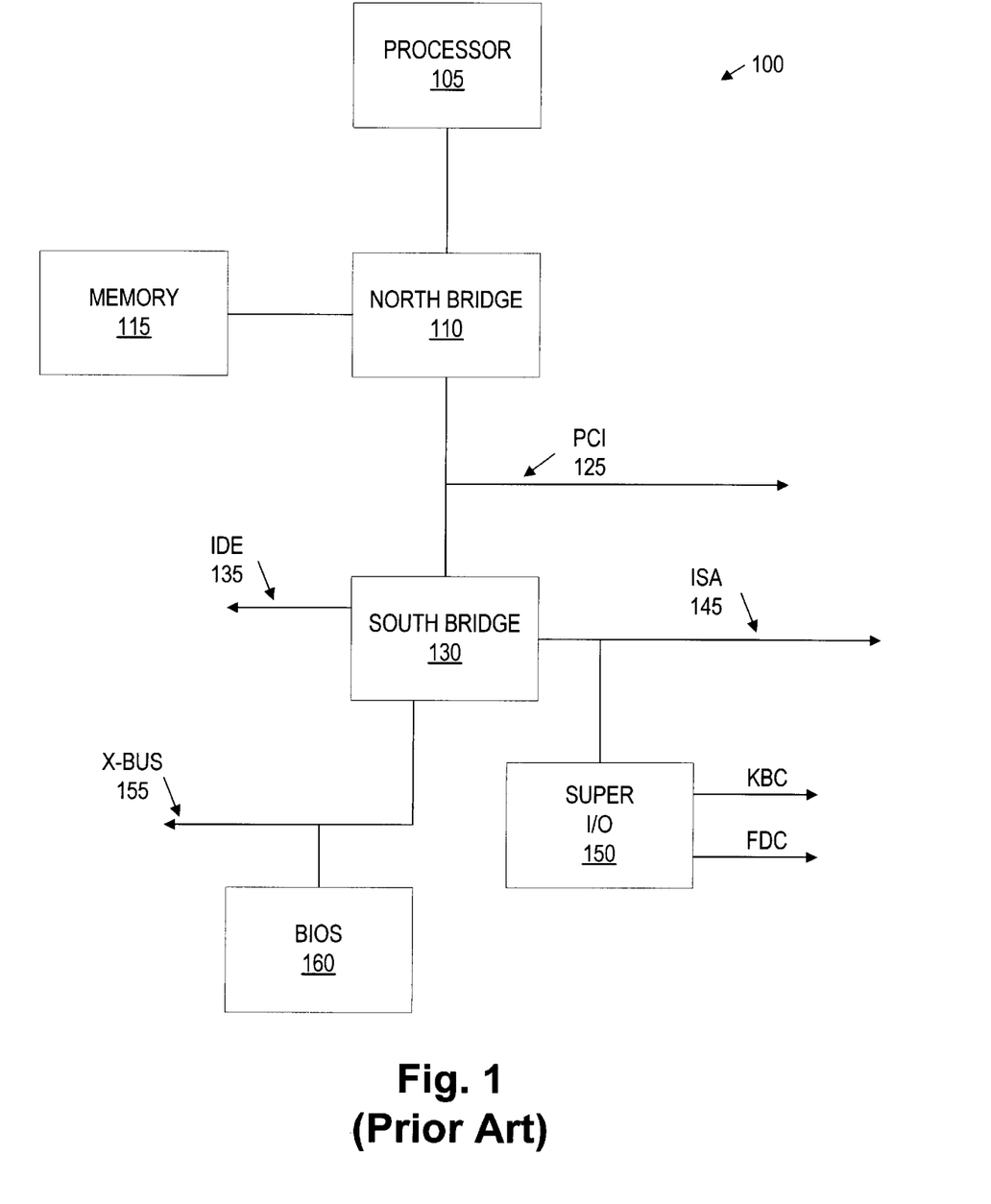
FIG. 1 illustrates a block diagram of an embodiment of a prior art legacy computer system.

FIG. 1 illustrates an exemplary legacy computer system 100. The computer system 100 includes a processor 105, north bridge 110, memory 115, Peripheral Component Interconnect (PCI) bus 125, south bridge 130, AT Attachment (ATA) interface 135 (more commonly known as an Integrated Drive Electronics (IDE) interface) Industry Standard Architecture (ISA) bus 145, input/output controller chip (SuperI/O™) 150, keyboard and mouse controller (KBC) interface, floppy disk controller (FDC) interface, X-bus 155, and BIOS memory 160. It is noted that the north bridge 110 and the south bridge 130 may include only a single chip or a plurality of chips, leading to the collective term "chipset." It is also noted that other buses, devices, and/or subsystems may be included in the computer system 100 as desired, e.g. caches, modems, parallel or serial interfaces, SCSI interfaces, network interface cards, etc. ["SuperI/O" is a trademark of National Semiconductor Corporation of Santa Clara, Calif.]

The processor 105 is coupled to the north bridge 110. The north bridge 110 provides an interface between the processor 105, the memory 115, and the PCI bus 125. The south bridge 130 provides an interface between the PCI bus 125 and the peripherals, devices, and subsystems coupled to the IDE interface 135, the ISA bus 145, and the X-bus 155. The Super I/O™ chip 150 is coupled to the ISA bus 145.

The north bridge 110 provides communications access between and/or among the processor 105, memory 115, devices coupled to the PCI bus 125, and devices and subsystems coupled to the south bridge 130. Typically, removable peripheral devices are inserted into PCI "slots" (not shown) that connect to the PCI bus 125 to couple to the computer system 100. Alternatively, devices located on a motherboard may be directly connected to the PCI bus 125.

The south bridge 130 provides an interface between the PCI bus 125 and various devices and subsystems, especially legacy devices, such as a modem, a printer, keyboard, mouse, etc., which have generally been coupled to the computer system 110 through the X-bus 155, the ISA bus 145, and, more recently, the IDE interface 135. The south bridge 130 includes the logic necessary to interface the legacy devices to the rest of computer system 100 through the IDE interface 135, the ISA bus 145, and the X-bus 155.

As used in this application, the terms "legacy device" or "legacy subsystem" refer to any bus, bridge, chip or chipset (e.g. processor, north bridge, south bridge), device, or subsystem that has a specification used to define said bus, bridge, chipset, device or subsystem. It is noted that a portion of bus, bridge, chipset, device or subsystem is enough for the "legacy" tag to apply. For example, V.90 modem that couples to the computer system 100 via the ISA bus could be referred to as a legacy ISA modem, or as a legacy V.90 modem.

It is also noted that the age of the technology does not necessarily correlate to bus, bridge, chipset, device or subsystem, having the legacy tag. It is enough that at least a portion of the specification for the bus, bridge, chipset, device or subsystem be defined well enough for interoperability with similarly defined buses, bridges, chipsets, devices or subsystems.

One problem with legacy buses, bridges, chips, devices and subsystems is that their specifications often preclude expansion or improvement in at least one way. For each legacy bus, bridge, chipset, device or subsystem certain improvements to the design and use of that legacy bus, bridge, chipset, device or subsystem may be unavailable. The usual design route in most cases is to replace the legacy technology with different technology, which may be newer or "improved" in some way.

Figure 2:
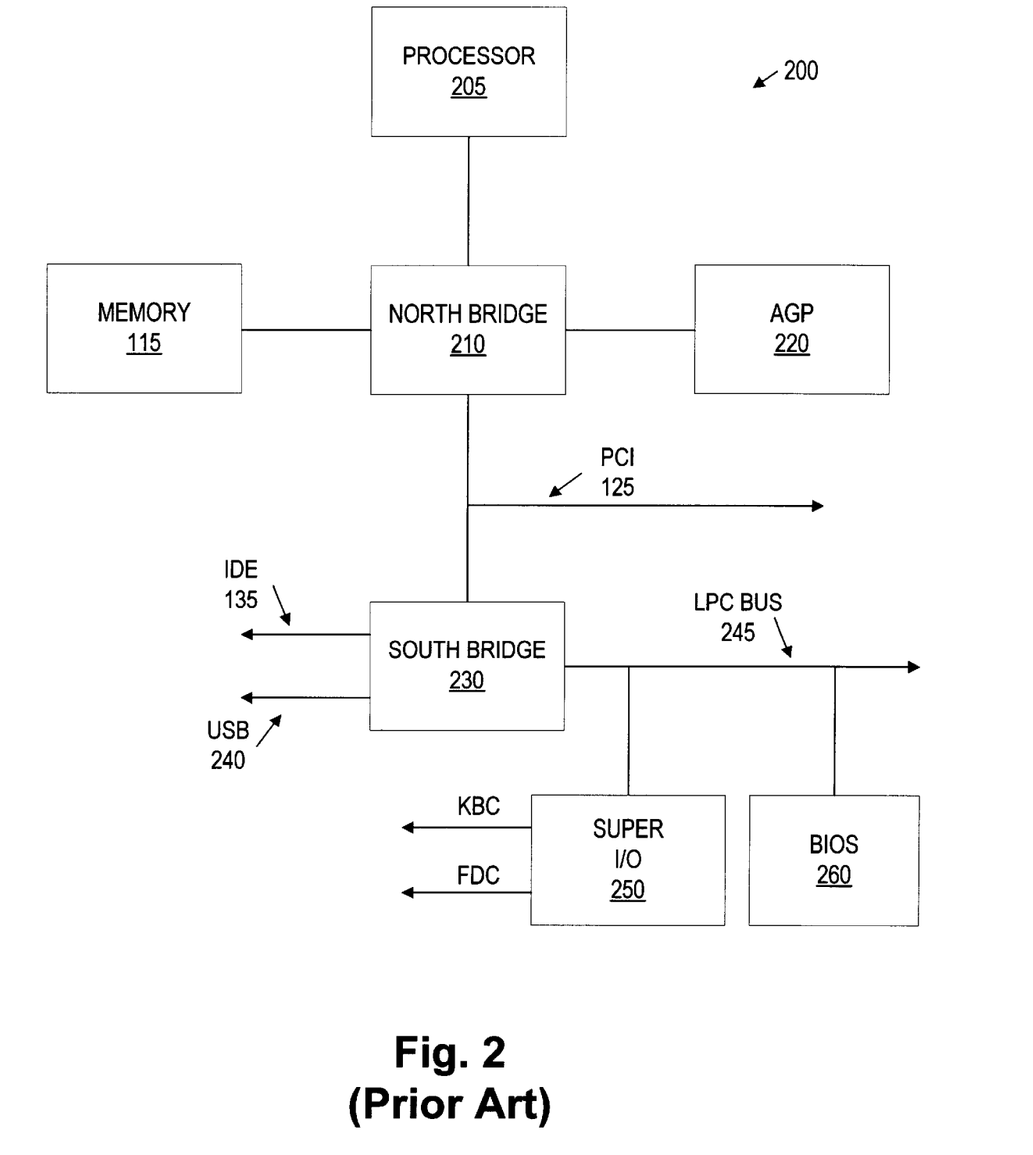
FIG. 2 illustrates a block diagram of an embodiment of an improved prior art legacy computer system.

FIG. 2 illustrates an exemplary computer system 200 that includes a processor 205, north bridge 210, memory 115, Advanced Graphics Port (AGP) memory 220, PCI bus 125, south bridge 230, IDE interface 135, Universal Serial Bus (USB) interface 240, Low Pin Count (LPC) bus 245, Super I/O™250, KBC, FDC, and BIOS memory 260.

The processor 205 is coupled to the north bridge 210. The north bridge 210 provides an interface between the processor 205, the memory 115, the AGP memory 220, and the PCI bus 125. The south bridge 230 provides an interface between the PCI bus 125 and peripherals, devices, and subsystems coupled to the IDE interface 135, the USB interface 240, and the LPC bus 245. The Super I/O™ chip 250 and the BIOS memory 260 are shown coupled to the LPC bus 245.

The north bridge 210 provides communications access between and/or among the processor 205, memory 115, AGP memory 220, devices coupled to PCI bus 125, and devices and subsystems coupled to the south bridge 230. The south bridge 230 provides an interface between the PCI bus 125 and various devices and subsystems coupled to the computer system 200 through the IDE interface 135, the USB interface 240, and the LPC bus 245.

Although several newer or improved technologies are present in computer system 200 that are not in the computer system 100, those different technologies now represent legacy technology themselves. The present invention is directed to overcoming, or at least reducing the effects of, using one or more of the legacy technologies in computer systems such as the computer system 200 or improvements thereof.

SUMMARY OF THE INVENTION

In one aspect of the present invention, a method is provided for performing transactions over a bus. The method includes transmitting a first signal indicating a transaction request of a first kind. The method further transmits a second signal indicating a transaction request of a second kind. The second signal may be decoded according to a plurality of protocols. The method also decodes the first signal prior to decoding the second signal. The decode of the first signal indicates which of the plurality of protocols should be used to decode the second signal.

In various embodiments, the method further includes transmitting a third signal and decoding the third signal according to the protocol used to decode the second signal.

The method may also include decoding signals subsequent to the third signal according to the protocol used to decode the second signal until a subsequent second signal is transmitted. The second signal may be a START signal, such as is required in the Low Pin Count Interface Specification Revision 1.0 of Sep. 29, 1997.

In another aspect of the present invention, a computer system is provided. The computer system includes a bus, a first device coupled to the bus and operable to perform transactions over the bus, and a second device coupled to the bus and operable to receive transactions over the bus. The first device is further operable to transmit a first signal indicating a transaction request of a first kind and a second signal indicating a transaction request of a second kind. The second device is further operable to decode the first signal prior to decoding the second signal. The decode of the first signal indicates which of a plurality of protocols that the second device should use to decode the second signal.

In various embodiments, the first device is further operable to transmit a third signal, and the second device is further operable to decode the third signal according to the protocol used to decode the second signal. The first may also be operable to transmit signals subsequent to third signal, with the second device operable to decode the signals subsequent to the third signal according to the protocol used to decode the second signal until a subsequent second signal is decoded. In a preferred embodiment, the bus is operable concurrently to convey four bits of data. The second signal decodes to "0000" when the default protocol conforms to the Low Pin Count Interface Specification Revision 1.0 of Sep. 29, 1997.

BRIEF DESCRIPTION OF THE DRAWINGS

The invention may be understood by reference to the following description taken in conjunction with the accompanying drawings, in which like reference numerals identify similar elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 3:
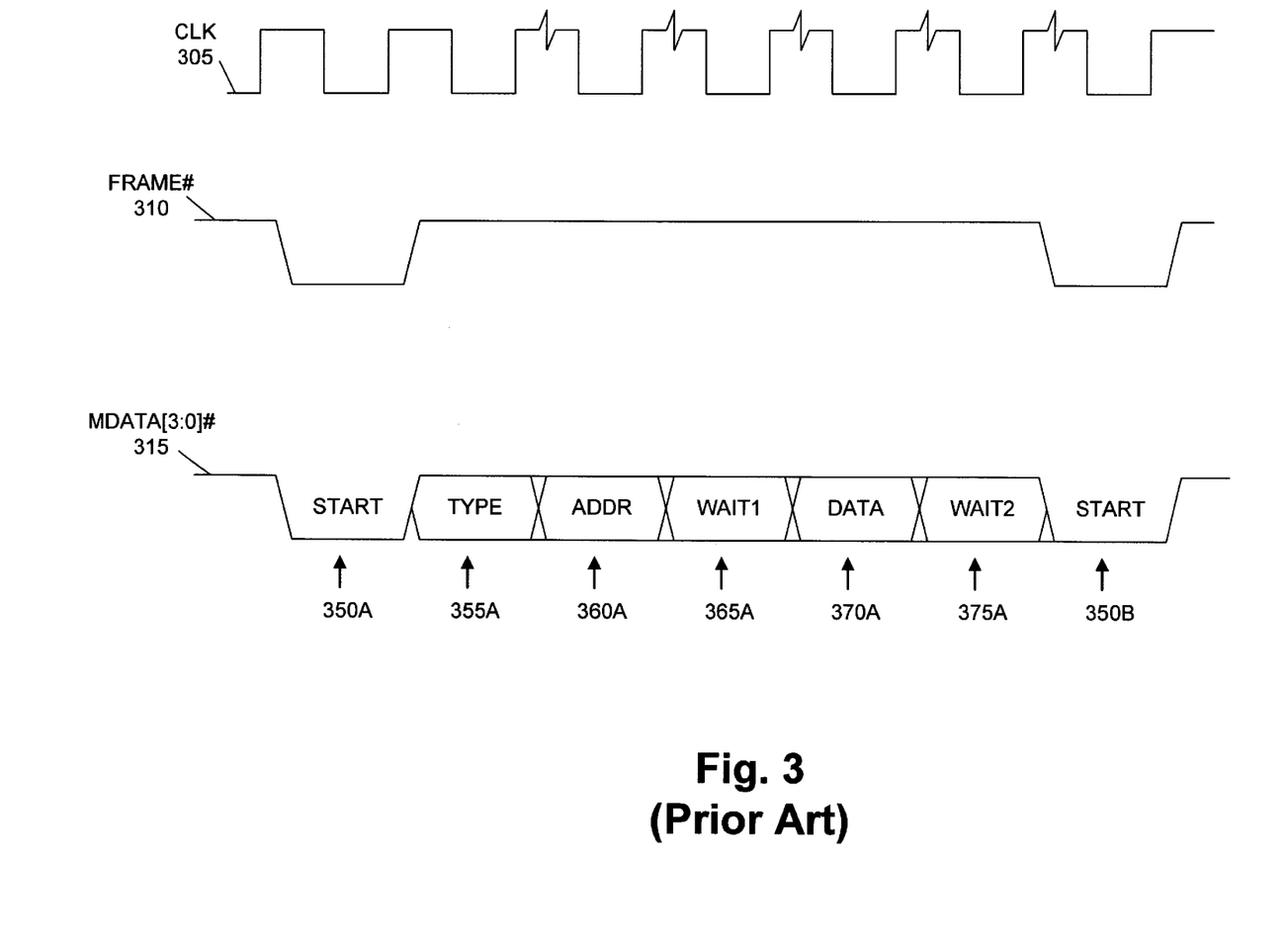
FIG. 3 illustrates an exemplary timing diagram for a data frame for a prior art LPC bus transaction.

Referring now to the drawings, and in particular to FIG. 3, an exemplary timing diagram for a data frame for a legacy LPC bus transaction, such as might exist in the computer system 200 of FIG. 2, is illustrated. A clock (CLK) signal 305 is shown aligned in time with a framing (FRAME#) signal 310 and multiplexed control, address, and data (MDATA[3:0]#) signals 315. It is noted that the FRAME# signal 310 and MDATA[3:0]# signals 315 are shown clocked on the rising edges of the CLK signal 305.

As illustrated, a host device, such as the south bridge 230 is the master of the LPC bus 245. The host 230 device asserts on the LPC bus 245 the FRAME# signal 310 for one clock period and concurrently delivers a START signal 350A as the MDATA[3:0]# signals 315. Exemplary values for the START signal 350A are given below in Table 1. The devices connected to the LPC bus 245 stop driving the MDATA signals 315 on the LPC bus 245 upon observing the FRAME# signal 310 being asserted. These devices monitor the START signal 350A while the FRAME# signal 310 is asserted. If the devices connected to the LPC bus 245 recognize the cycle on the LPC bus 245 from the value of the START signal 350A, then the devices attempt to decode the remainder of the cycle. If the devices connected to the LPC bus 245 do not recognize the cycle on the LPC bus 245 from the value of the START signal 350A, then the devices ignore the cycle until the next time that the FRAME# 310 signal is asserted.

TABLE 1

| MDATA[3:0]# | START value |
|---|---|
| 0000 | Start of cycle for a target device |
| 0001 | reserved |
| 0010 | Grant for first bus master |
| 0011 | Grant for second bus master |
| 0100–1110 | reserved |
| 1111 | Stop/abort/end of cycle |

The host device transmits the TYPE signal 355A over the LPC bus 245 as MDATA[3:0]# signals 315 immediately after the START signal 350A. The host also de-asserts the FRAME# signal 310 during the clock cycle in which the TYPE signal 355A is transmitted. Exemplary values for the TYPE signal 355A are given below in Table 2.

TABLE 2

| MDATA[3:0]# | TYPE value |
| --- | --- |
| 000x | I/O Read |
| 001x | I/O Write |
| 010x | Memory Read |
| 011x | Memory Write |
| 100x | DMA Read |
| 101x | DMA Write |
| 11xx | reserved |

It is noted that a SIZE signal may be transmitted over the LPC bus 245 as the MDATA[3:0]# signals 315 to indicate the number of bits in a data transfer. The signal may follow the TYPE signal 355A. The SIZE signal field is suitably encoded as desired, "00" for an 8 bit transfer, "01" for a 16-bit transfer, and "11" for a 32-bit transfer. Some encodings for the SIZE signal may be reserved, while others may be undefined. As there are four bits in the MDATA[3:0]# signals 315 in one embodiment, bits 0 and 1 are encoded, with bits 2 and 3 driven to 0 and ignored by the target device.

The host next transmits an address (ADDR) signal 360A. The ADDR signal 360A is typically multiple clock periods long so that address spaces that need more than the number of bus lines may be accessed. For example the host next enters a first waiting period, which is communicated to the target device via a first wait (WAIT1) signal 365A, to account for turnaround delays in changing control to and from the host and a device. In one embodiment, the master drives the LPC bus 245 high for at least the first clock period during the WAIT1 period 365A.

The host next transfers a DATA signal 370A during two clock periods, representing one byte. The DATA signal 370A may be driven by the host or the target device, depending on the direction of data flow. The host next enters a second waiting period, which is communicated to the target device via a second wait (WAIT2) signal 375A. This second waiting period allows the host and the target device to achieve synchronization. The second waiting period is achieved by adding wait states that may be required. The length of the WAIT2 signal 375A may be determined by the encoding of the WAIT2 signal 375A. Other encodings of the WAIT2 signal 375A may be error codes, which the host may choose to propagate through the appropriate computer subsystem. A new transaction is indicated by a new START signal 350B during an asserted FRAME# signal 310.

Figure 4:
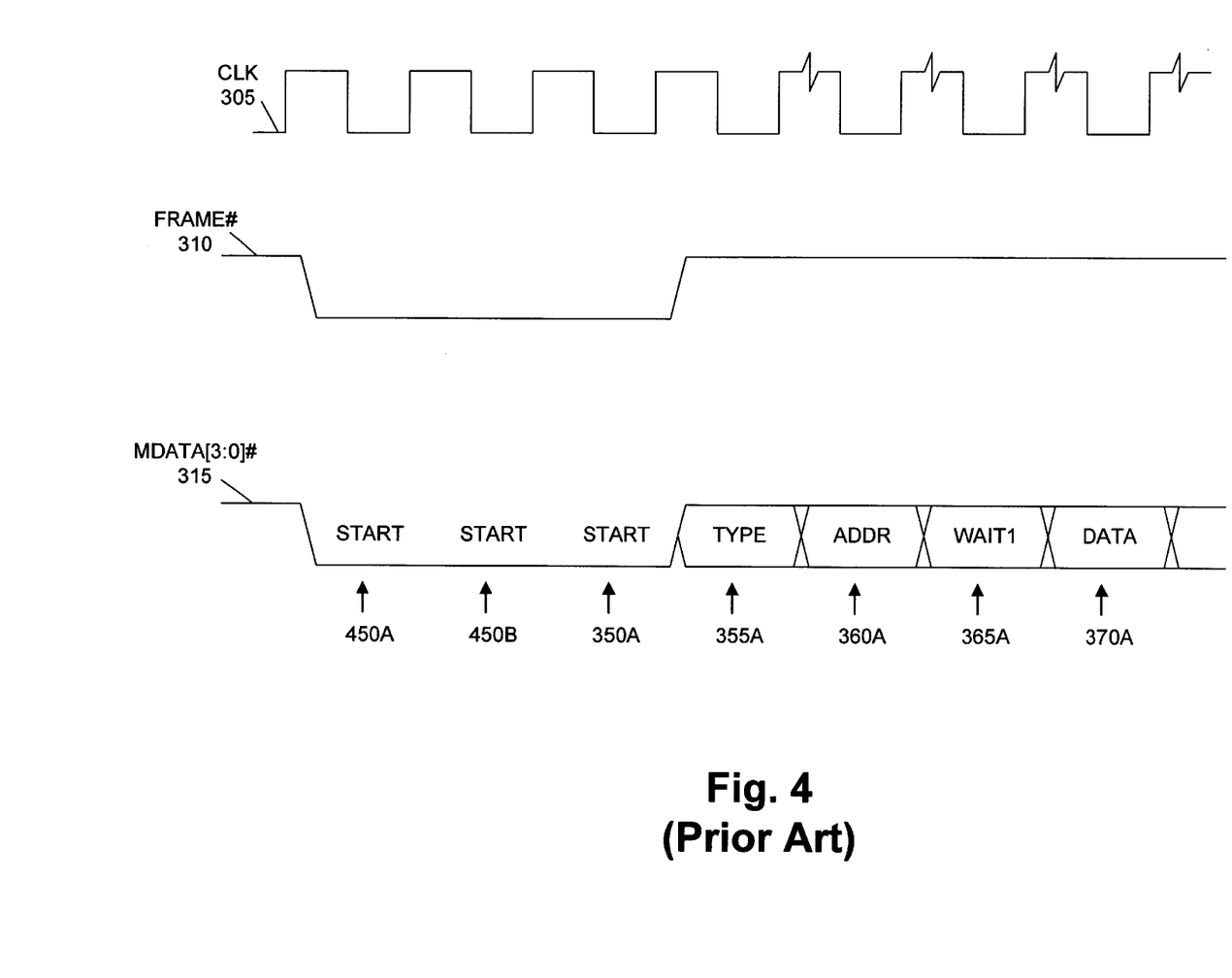
FIG. 4 illustrates an exemplary timing diagram of an allowable extended-start data frame for a prior art LPC bus transaction.

Turning now to FIG. 4, an exemplary timing diagram of an exemplary extended-start data frame for a legacy LPC bus transaction is illustrated. Many of the features of FIG. 4 are similar to those seen in FIG. 3 and will not be separately discussed here. The LPC bus 245 allows for the FRAME# signal 310 and the START signal 350A/450A to be asserted for more than one clock period. Transactions on the LPC bus 245 are governed by an industry specification, the LPC Interface Specification Revision 1.0 of Sep. 27, 1997. This specification requires the target device to always use the last START 350A/450A value, so long as the FRAME# signal 310 is asserted.

A plurality of START signals 450A, 450B, and 350A with identical values are illustrated. The values could also differ between any of the three START signals 450A, 450B, and 350A. The target device only uses the value of the last START signal 350A, according to the LPC Interface Specification.

Figure 5:
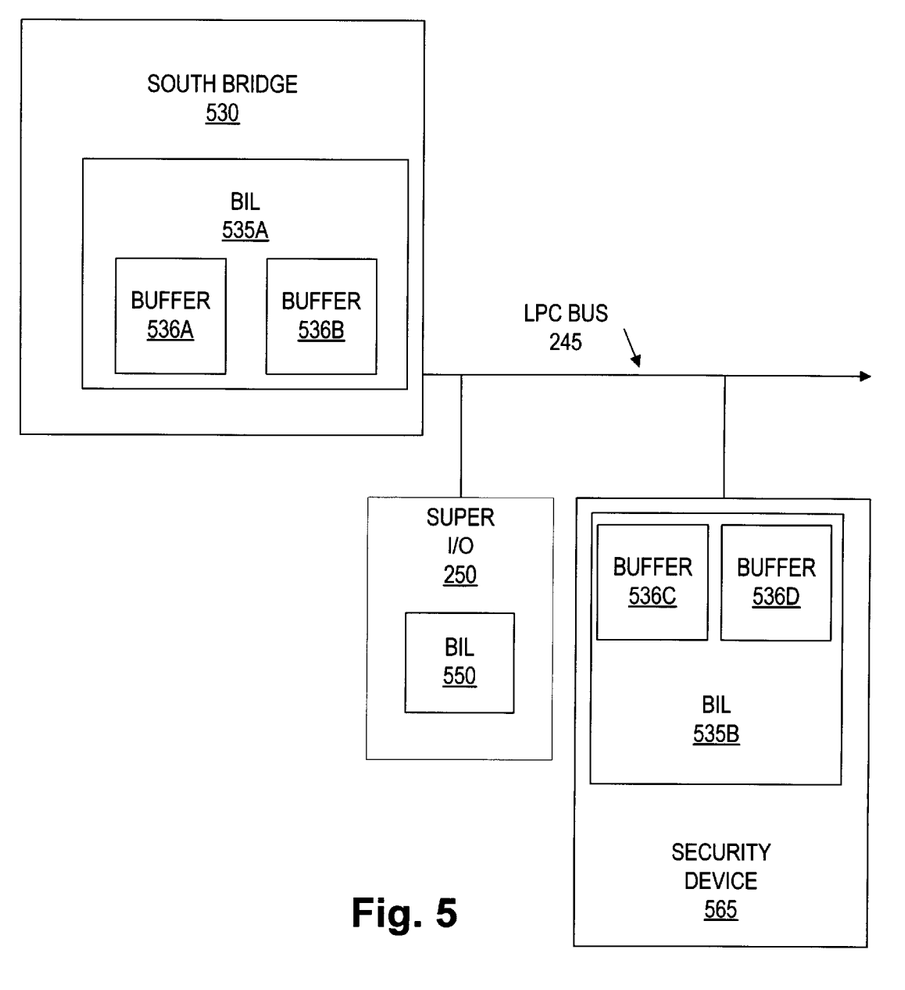
FIG. 5 depicts a computer subsystem including one embodiment of an LPC bus and associated devices for legacy and extended transactions, according to one aspect of the present invention.

Turning now to FIG. 5, a computer system 500 including one embodiment of the enhanced LPC bus 245 and associated devices according to one aspect of the present invention are shown. Illustrated are a south bridge 530, bus interface logic (BIL) 535A, buffers 536A and 536B, an LPC bus 245, a prior art SuperI/O™ chip 250, a BIL 550, a security device 565, a BIL 535B, and buffers 536C and 536D. The south bridge 530 is coupled to the SuperI/O™ chip 250 and the security device 565 through the LPC bus 245. The BIL 535A is included in the south bridge 530, while the BIL 535B is included in the security device 565. The BIL 550 is included in the Super I/O chip 250. The buffers 536A and 536B are included in the BIL 535A. The buffers 536C and 536D are included in the BIL 535B. The BIL 535A is operable to initiate and complete transactions over the LPC bus 245 using both legacy LPC transactions and extended LPC transactions, embodiments of which are described herein. The BIL 535B is operable to initiate or receive only legacy LPC transactions over the LPC bus 245.

It is noted that the presence of the SuperI/O™ chip 250 and the security device 565 are not required according to all embodiments of the present invention. They are illustrative only, showing a device (SuperI/O™ 250), that includes the BIL 550, and is operable to initiate and decode only legacy LPC transactions, and an extended device (security device 565), that includes the BIL 535B and is operable to initiate and decode only extended (non-standard) LPC transactions over the LPC bus 245. It is also noted that the BIL 535A and/or the BIL 535B may be external to the south bridge 530 and/or the device illustrated by the security device 565. By way of example and not limitation, the BIL 535A and/or the BIL 535B may be coupled to an interface port connected to the LPC bus 245.

Various embodiments of security device 565 may include a private memory, a secure random number generator, and/or a device or subsystem that is only accessible during well-defined modes of operation, e.g. secure mode, standard mode, etc. It is contemplated that devices or subsystems may also initiate and decode both standard LPC transactions and extended LPC transactions.

Figure 6:
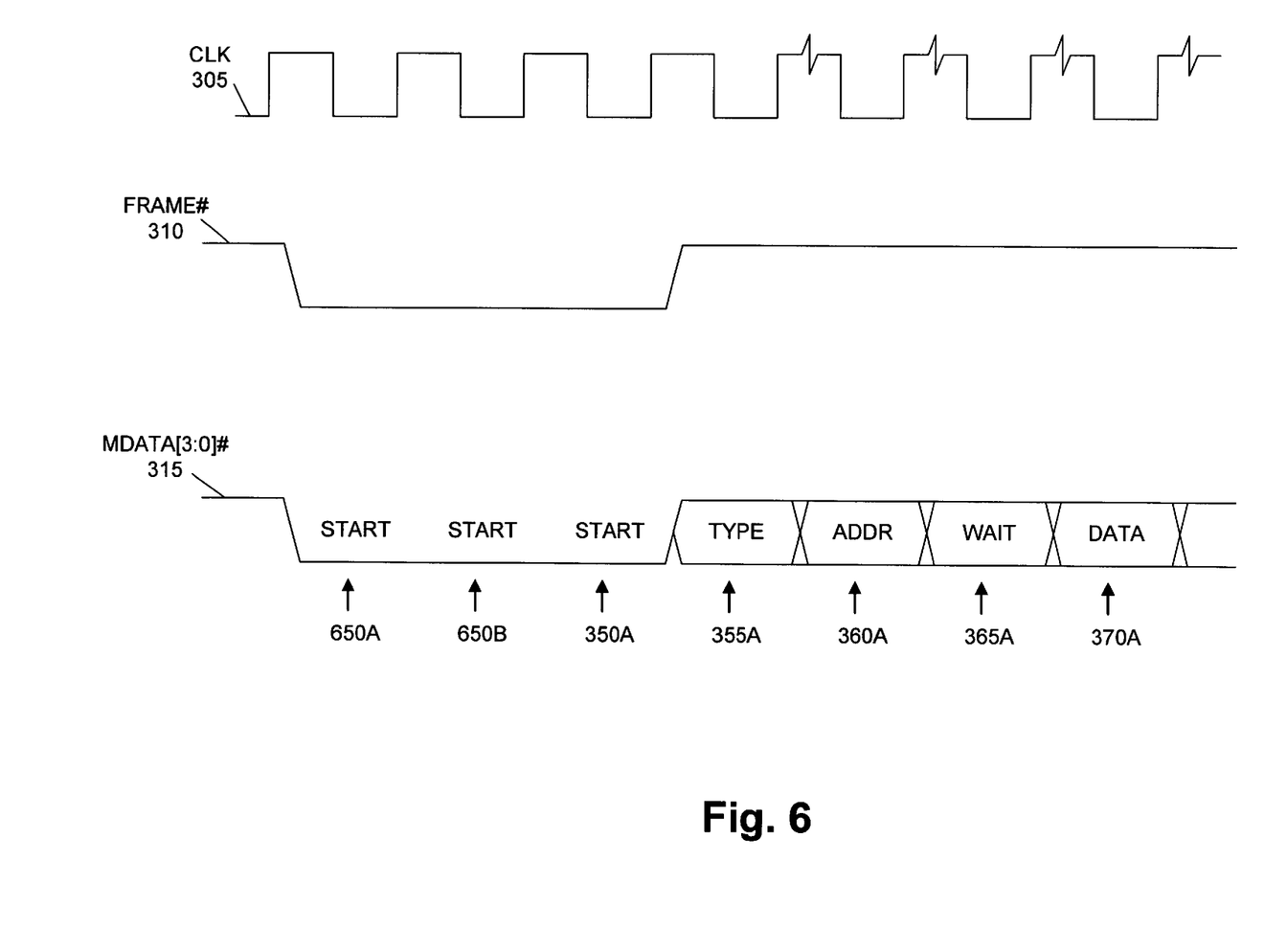
FIG. 6 illustrates one embodiment of a flow chart of a method for utilizing an LPC bus for extended transactions, according to one aspect of the present invention.

FIG. 6 illustrates an exemplary timing diagram of one embodiment of an extended LPC bus transaction over an LPC bus 245 to provide a legacy LPC bus transaction according to one aspect of the present invention. Many of the features of FIG. 6 are discussed above art FIGS. 3 and 4, and will not be repeated here. The LPC bus protocol ignores START signals 650A and 650B. Instead, START value 350A is decoded and the target device or devices attempt to decode the remainder of the data transfer as shown in FIG. 4.

According to one embodiment of the present invention, START signal 650B is captured and decoded. The value of the decode of START signal 650B indicates that START signal 350A and following are to be interpreted as a standard LPC bus transaction, if possible. This may advantageously allow for devices and/or subsystems attached to the LPC bus 245 to ignore extended LPC transactions, while decoding LPC bus transactions addressed to those devices and/or subsystems.

Figure 7:
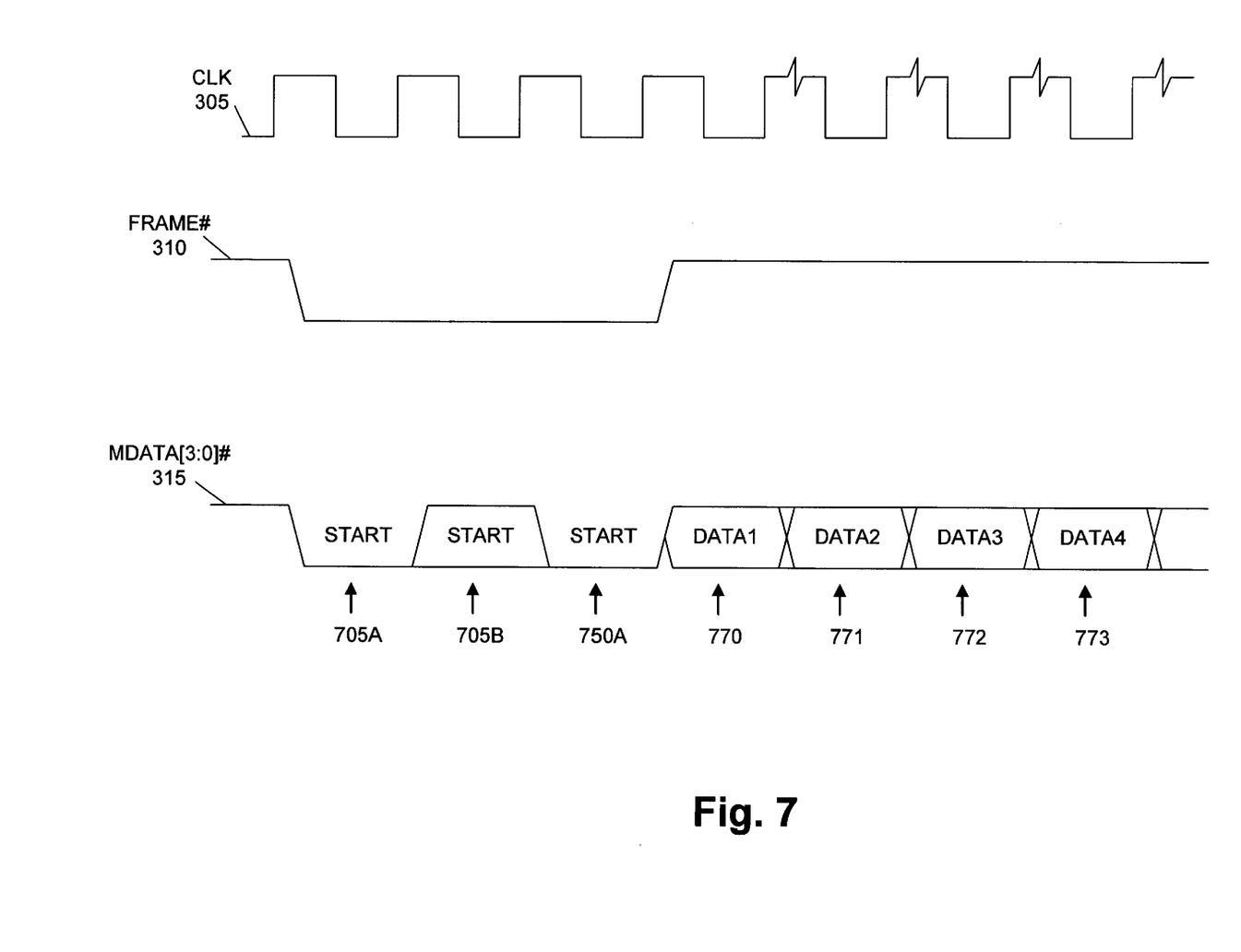
FIG. 7 illustrates an exemplary timing diagram of one embodiment of an LPC-compliant bus transaction over an LPC bus, according to one aspect of the present invention.

FIG. 7 illustrates an exemplary timing diagram of one embodiment of a bus transaction over an LPC bus 245, utilizing an extended LPC protocol according to one aspect of the present invention. The CLK signal 305, FRAME# signal 310, and MDATA[3:0]# signal 315 lines are described above with respect to FIG. 3 and are not repeated here.

As shown, the FRAME # signal 310 is asserted for 3 clock periods. Concurrently, START signals 705A, 705B, and 750A are transmitted over the LPC Bus 245 as the MDATA [3:0]# signals 315. Data packets DATA1–DATA4 770–773 follow thereafter.

The LPC bus devices that recognize only the legacy LPC bus protocol should ignore the START signals 705A and 705B as required by the LPC interface specification. If the decoded value of the START signal 750A is valid for a legacy LPC bus transaction, then the legacy LPC bus devices should attempt to decode the remainder of the bus transaction until an error condition or exit condition is reached.

The LPC bus devices that recognize an extended LPC bus protocol, according to one aspect of the present invention, are operable to recognize and decode the multiple START signals that have been transmitted. According to one embodiment, the last two START signals 705B and 750A are decoded. The decoded value of the START signal 705B is used decode the START signal 750A. The extended LPC bus protocol aware device then decodes the data in data packets DATA1–DATA5 770–773 using the decode of the START signal 750A.

Figure 8:
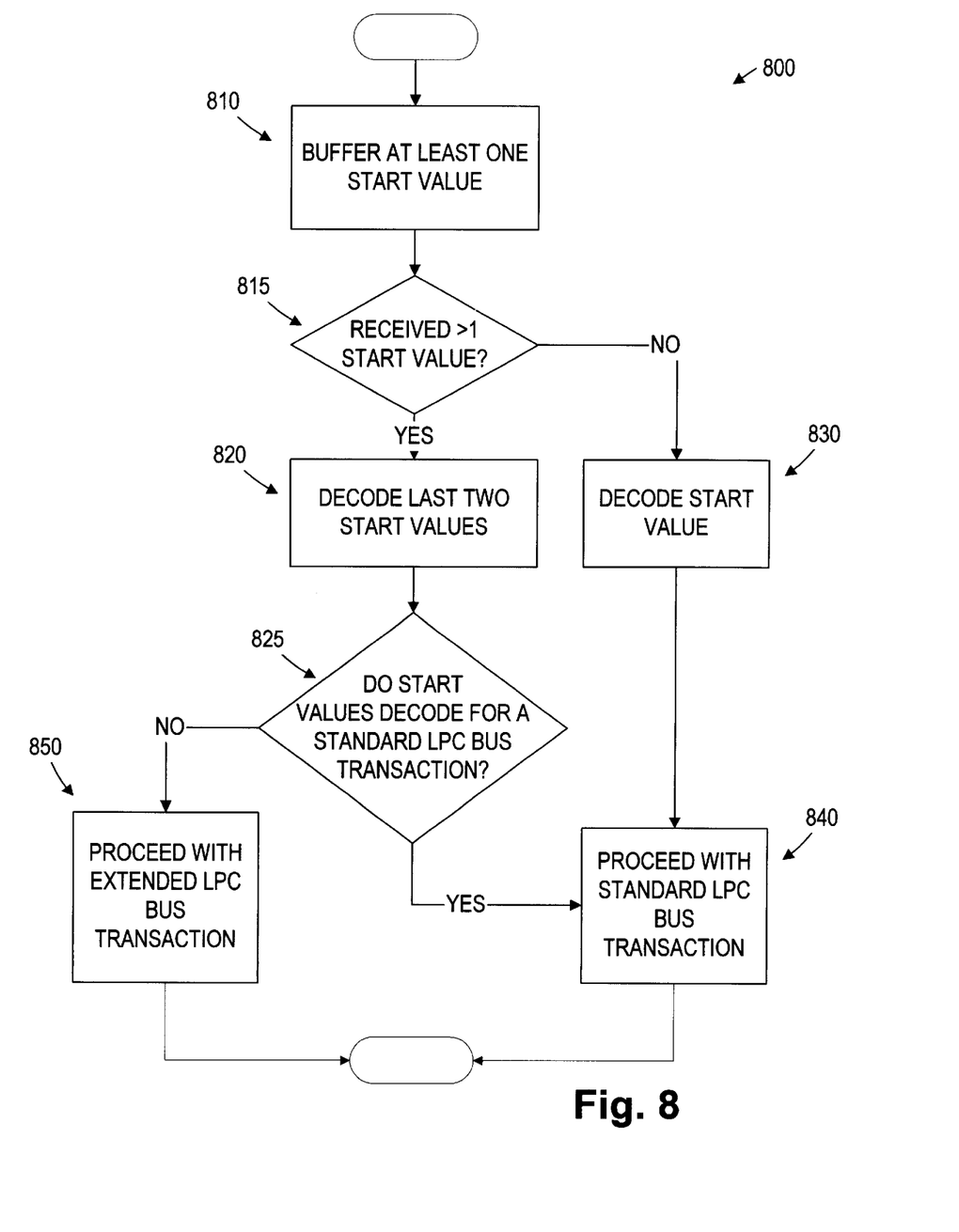
FIG. 8 illustrates an exemplary timing diagram of one embodiment of an extended LPC bus transaction over an LPC bus, according to one aspect of the present invention.

FIG. 8 illustrates a flow chart 800 of one embodiment of a method for utilizing the LPC bus 245 for extended data transactions, according to one aspect of the present invention. The method comprises buffering at least one START signal 350A/450A in block 810. The method checks for the presence of more than one START signal in decision block 815. Various ways for checking (in box 815) are contemplated, including buffering every START signal received, buffering using FIFO buffers with flag bits, buffering one START signal and checking a next received value against the buffered START signals, etc.

If only one START signal is received at decision block 815, then the method decodes the START signal in box 830. If more than one START signal is received at decision block 815, then the method decodes the last two START signals received in box 820.

If one START signal is decoded in box 830, the method proceeds with a legacy LPC bus transaction in box 840. If two START signals are decoded in box 820, the method checks in decision block 825 to see if the START signals decode for a standard LPC bus transaction. If a legacy LPC bus transaction is indicated in decision block 825, then the method proceeds with a legacy LPC bus transaction in block 840. If a legacy LPC bus transaction is not indicated in decision block 825, then the method proceeds with an extended LPC bus transaction in block 850 according to one aspect of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for performing transactions over a bus, comprising:
   transmitting a first signal indicating a transaction request encoded according to at least one of a first protocol and a second protocol;
   transmitting a second signal indicating the transaction request encoded according to at least one of the first protocol and the second protocol;
   determining that the first protocol is used by a first device to decode the transaction using the first signal and the second signal; and
   determining that the second protocol is used by a second device to decode the transaction using the second signal, the second device being adapted to ignore the first signal.

2. The method of claim 1, further comprising:
   transmitting a third signal; and
   decoding the third signal according to the protocol used to decode the second signal.

3. The method of claim 2, further comprising:
   decoding one or more signals subsequent to the third signal according to the protocol used to decode the second signal until a subsequent second signal is transmitted.

4. The method of claim 1, wherein transmitting the second signal includes transmitting a START signal.

5. The method of claim 4, further comprising:
   transmitting a TYPE signal following the START signal.

6. The method of claim 1, wherein transmitting the second signal includes transmitting '0000' over four lines of the bus.

7. The method of claim 1, wherein transmitting the second signal includes transmitting a default signal on the bus indicating that a default protocol of the plurality of protocols should be used to decode subsequent signals.

8. The method of claim 7, wherein transmitting a default signal includes transmitting a default protocol that conforms to the Low Pin Count interface specifications as of Sep. 29, 1997.

9. The method of claim 1, wherein transmitting the first signal comprises transmitting a START signal.

10. A computer system, comprising:
    a bus;
    a first device coupled to the bus and operable to perform transaction over the bus, wherein the first device is further operable to transmit a first signal and a second signal, the first and second signals indicating a transaction request encoded according to at least one of a first protocol and a second protocol;
    a second device coupled to the bus and operable to receive transactions over the bus, wherein the second device is further operable to decode the first signal prior to decoding the second signal, and wherein the decoded first signal indicates that the transaction is to be decoded using the first protocol; and
    a third device coupled to the bus and operable to receive transactions over the bus, wherein the third device is configured to ignore the first signal and to decode the second signal, the second signal indicating that the transaction is to be decoded according to the second protocol.

11. The computer system of claim 10, wherein the first device is further operable to transmit a third signal; and wherein the second device is further operable to decode the third signal according to the protocol used to decode the second signal.

12. The computer system of claim 11, wherein the first device is further operable to transmit signals subsequent to the third signal; and wherein the second device is further operable to decode the signals subsequent to the third signal according to the protocol used to decode the second signal until a subsequent second signal is decoded.

13. The computer system of claim 12, wherein the second signal is a START signal.

14. The computer system of claim 13, further comprising: transmitting a TYPE signal following the START signal.

15. The computer system of claim 10, wherein the bus is operable concurrently to convey four bits of data; and the second signal decodes to '0000'.

16. The computer system of claim 10, wherein the second signal is a default signal on the bus indicating that a default protocol should be used to decode subsequent signals.

17. The computer system of claim 16, wherein the default protocol conforms to the Low Pin Count interface specification as of Sep. 29, 1997.

18. The computer system of claim 9, wherein the second device includes bus interface logic coupled to the bus, wherein the bus interface logic includes at least one storage location for storing the first signal.

19. The computer system of claim 18, wherein the bus interface logic includes a plurality of storage locations for storing the first and second signals.

20. The computer system of claim 10, wherein the first signal comprises a START signal.

21. A computer system, comprising:

means for transmitting a first signal indicating a transaction request encoded according to at least one of a first protocol and a second protocol;

means for transmitting a second signal indicating the transaction request encoded according to at least one of the first protocol and the second protocol;

means for determining that the first protocol is used by a first device to decode the transaction using the first signal and the second signal; and means for determining that the second protocol is used by a second device to decode the transaction using the second signal, the second device being adapted to ignore the first signal.

22. The computer system of claim 21, further comprising:

means for transmitting a third signal; and means for decoding the third signal according to the protocol used to decode the second signal.

23. The computer system of claim 22, further comprising:

means for decoding one or more signals subsequent to the third signal according to the protocol used to decode the second signal until a subsequent second signal is transmitted.

24. The computer system of claim 21, wherein the means for transmitting the first signal comprise means for transmitting a START signal.

25. A computer system, comprising:

a bus;

a bridge coupled to the bus and operable to perform transactions over the bus, wherein the bridge is further operable to transmit a first signal and a second signal, the first and second signals indicating a transaction request encoded according to at least one of a first protocol and a second protocol;

an input/output controller coupled to the bus and operable to receive transactions over the bus, wherein the input/output controller is further operable to decode the first signal prior to decoding the second signal, and wherein the decoded first signal indicates that the transaction is to be decoded using the first protocol; and a memory coupled to the bus and operable to receive transactions over the bus, wherein the memory is configured to ignore the first signal and to decode the second signal, the second signal indicating that the transaction is to be decoded according to the second protocol.

26. The computer system of claim 25, wherein the bridge is further operable to transmit a third signal; and wherein the input/output controller is further operable to decode the third signal according to the protocol used to decode the second signal.

27. The computer system of claim 26, wherein the bridge is further operable to transmit signals subsequent to the third signal; and wherein the input/output controller is further operable to decode the signals subsequent to the third signal according to the protocol used to decode the second signal until a subsequent second signal is decoded.

28. The computer system of claim 27, wherein the second signal is a START signal.

29. The computer system of claim 28, further comprising transmitting a TYPE signal following the START signal.

30. The computer system of claim 25, wherein the bus is operable concurrently to convey four bits of data; and the second signal decodes to '0000'.

31. The computer system of claim 25, wherein the second signal is a default signal on the bus indicating that a default protocol should be used to decode subsequent signals.

32. The computer system of claim 31, wherein the default protocol conforms to the Low Pin Count interface specification as of Sep. 29, 1997.

33. The computer system of claim 25, wherein the input/output controller includes bus interface logic coupled to the bus, wherein the bus interface logic includes at least one storage location for storing the first signal.

34. The computer system of claim 33, wherein the bus interface logic includes a plurality of storage locations for storing the first and second signals.

35. The computer system of claim 25, wherein the memory is a BIOS memory.

36. The computer system of claim 25, wherein the bus is a LPC bus.

37. The computer system of claim 25, wherein the input/output controller is a Super I/O controller.

38. The computer system of claim 25, wherein the first signal comprising a START signal.

* * * * *